United States Patent
Pokorny et al.

(10) Patent No.: US 10,941,313 B2
(45) Date of Patent: Mar. 9, 2021

(54) FLEXIBLE HARDCOAT COMPRISING URETHANE OLIGOMER HYDROGEN BONDED TO AN ACRYLIC POLYMER

(71) Applicant: 3M INNOVATIVE PROPERTIES COMPANY, St. Paul, MN (US)

(72) Inventors: Richard J. Pokorny, Maplewood, MN (US); Nicholas L. Untiedt, Minneapolis, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/346,722

(22) PCT Filed: Nov. 16, 2017

(86) PCT No.: PCT/US2017/061904
§ 371 (c)(1),
(2) Date: May 1, 2019

(87) PCT Pub. No.: WO2018/093975
PCT Pub. Date: May 24, 2018

(65) Prior Publication Data
US 2020/0071562 A1 Mar. 5, 2020

Related U.S. Application Data

(60) Provisional application No. 62/424,754, filed on Nov. 21, 2016.

(51) Int. Cl.
| | | |
|---|---|---|
| C09D 175/16 | (2006.01) | |
| C09D 7/62 | (2018.01) | |
| C08F 220/14 | (2006.01) | |
| C08G 18/24 | (2006.01) | |
| C08G 18/67 | (2006.01) | |
| C08G 18/79 | (2006.01) | |
| C09D 4/06 | (2006.01) | |
| C09D 133/10 | (2006.01) | |
| C08G 18/73 | (2006.01) | |
| C08G 18/78 | (2006.01) | |
| C08K 3/36 | (2006.01) | |
| C08F 222/10 | (2006.01) | |

(52) U.S. Cl.
CPC .......... *C09D 175/16* (2013.01); *C08F 220/14* (2013.01); *C08G 18/246* (2013.01); *C08G 18/672* (2013.01); *C08G 18/673* (2013.01); *C08G 18/73* (2013.01); *C08G 18/7831* (2013.01); *C08G 18/792* (2013.01); *C09D 4/06* (2013.01); *C09D 7/62* (2018.01); *C09D 133/10* (2013.01); *C08F 222/102* (2020.02); *C08K 3/36* (2013.01)

(58) Field of Classification Search
CPC .. C08F 220/14; C08F 222/102; C08G 18/246; C08G 18/672; C08G 18/792; C08G 18/673; C08G 18/73; C08G 18/7831; C09D 175/16; C09D 7/62; C09D 4/06; C09D 133/10; C08K 3/36
See application file for complete search history.

(56) References Cited

U.S. PATENT DOCUMENTS

| | | |
|---|---|---|
| 4,262,072 A | 4/1981 | Wendling |
| 5,175,030 A | 12/1992 | Lu |
| 5,183,597 A | 2/1993 | Lu |
| 6,376,590 B2 | 4/2002 | Kolb |
| 7,178,264 B2 | 2/2007 | Kim |
| 7,241,437 B2 | 7/2007 | Davidson |
| 7,267,850 B2 | 9/2007 | Coggio |
| 7,351,470 B2 | 4/2008 | Draheim |
| 8,992,720 B2 | 3/2015 | Bharti |
| 2008/0274352 A1 | 11/2008 | Hao |
| 2009/0029151 A1* | 1/2009 | Noguchi ............... G06F 3/045 428/327 |
| 2011/0077334 A1* | 3/2011 | Oi ....................... C08G 18/6254 524/264 |
| 2013/0012647 A1 | 1/2013 | Mihara |
| 2013/0295390 A1 | 11/2013 | Yamamoto |
| 2015/0037567 A1 | 2/2015 | Clear |
| 2015/0257985 A1 | 9/2015 | Sadowsky |

FOREIGN PATENT DOCUMENTS

| | | | |
|---|---|---|---|
| JP | 2009091390 | | 4/2009 |
| JP | 2009091390 A | * | 4/2009 |
| JP | 2014005393 | | 1/2014 |
| JP | 5476260 | | 2/2014 |

(Continued)

OTHER PUBLICATIONS

Espacenet Translation of JP2009091390 (Year: 2019).*
"The Chemistry of Polyurethane Coatings", Bayer Material Science, A General Reference Manual, 2016, pp. 1-32.
International Search Report for PCT International Application No. PCT/US2017/061904, dated Mar. 14, 2018, 6 pages.

*Primary Examiner* — Patrick D Niland
(74) *Attorney, Agent, or Firm* — Carolyn A. Fischer

(57) ABSTRACT

A hardcoat composition is described comprising urethane (meth)acrylate oligomer having a first functional groups; an acrylic polymer having second functional groups; wherein the first and second functional groups form a hydrogen bond; and silica nanoparticles. The hardcoat composition may be cured by actinic radiation, upon which the acrylic polymer may be removed by solvent extraction. Also described are articles comprising the cured hardcoat described herein disposed on a surface of a substrate and methods of making an article.

20 Claims, No Drawings

(56) References Cited

FOREIGN PATENT DOCUMENTS

| KR | 100252032 | 4/2000 |
|----|-----------|--------|
| WO | WO 2006-102383 | 9/2006 |
| WO | WO 2009-005975 | 1/2009 |
| WO | WO 2009-029438 | 3/2009 |
| WO | WO 2014-011731 | 1/2014 |
| WO | WO 2014-084093 | 6/2014 |

\* cited by examiner

FLEXIBLE HARDCOAT COMPRISING URETHANE OLIGOMER HYDROGEN BONDED TO AN ACRYLIC POLYMER

CROSS REFERENCE TO RELATED APPLICATIONS

This application is a national stage filing under 35 U.S.C. 371 of PCT/US2017/061904, filed Nov. 16, 2017, which claims the benefit of U.S. Provisional Application No. 62/424,754, filed Nov. 21, 2016, the disclosure of which is incorporated by reference in its/their entirety herein.

BACKGROUND

WO2009/005975 describes flexible hardcoat compositions and protective films comprising the reaction product of one or more urethane (meth)acrylate oligomers; at least one monomer comprising at least three (meth)acrylate groups; and optionally inorganic nanoparticles.

SUMMARY

Although various hardcoat compositions have been described, industry would find advantage in flexible hardcoat compositions having improved hardness, scratch resistance, and abrasion resistance.

In one embodiment, a hardcoat composition is described comprising urethane (meth)acrylate oligomer having a first functional groups; an acrylic polymer having second functional groups; wherein the first and second functional groups are capable of forming a hydrogen bond; and silica nanoparticles.

In other embodiments, articles are described comprising the cured hardcoat described herein disposed on a surface of a substrate.

Also described is a method of making an article comprising providing a substrate; providing the hardcoat composition as described herein on a surface of the substrate; and curing the hardcoat composition by exposure to actinic radiation.

DETAILED DESCRIPTION OF THE PREFERRED EMBODIMENTS

Presently described are hardcoat compositions formed from the reaction product of a polymerizable composition comprising one or more urethane (meth)acrylate oligomer(s). Typically, the urethane (meth)acrylate oligomer is a di(meth)acrylate, a tri(meth)acrylate, tetra(meth)acrylate, or a combination thereof. The term "(meth)acrylate" is used to designate esters of acrylic and methacrylic acids.

The urethane (meth)acrylate oligomer contributes to the conformability and flexibility of the cured hardcoat composition. In preferred embodiments, a 13 micron thick film of the cured hardcoat composition is sufficiently flexible such that it can be bent around a 5, 4, 3, or 2 mm mandrel without cracking.

In some embodiments, the urethane (meth)acrylate oligomer is synthesized from reacting a polyisocyanate compound with a hydroxyl-functional acrylate compound.

A variety of polyisocyanates may be utilized in preparing the urethane (meth)acrylate oligomer. "Polyisocyanate" means any organic compound that has two or more reactive isocyanate (—NCO) groups in a single molecule such as diisocyanates, triisocyanates, tetraisocyanates, etc., and mixtures thereof. For improved weathering and diminished yellowing the, urethane (meth)acrylate oligomer(s) employed herein are preferably aliphatic and therefore derived from an aliphatic polyisocyanate.

The urethane (meth)acrylate oligomer is typically the reaction product of hexamethylene diisocyanate (HDI), such as those available from Covestro LLC under the trade designation "Desmodur H", or a derivative thereof. These derivatives include, but are not limited to, polyisocyanates containing biuret groups, such as the biuret adduct of hexamethylene diisocyanate (HDI) available from Covestro LLC under the trade designation "Desmodur N-100", polyisocyanates containing isocyanurate groups, such as those available from Covestro under trade designation "Desmodur N-3300", as well as polyisocyanates containing urethane groups, uretdione groups, carbodiimide groups, allophonate groups, and the like. Yet another useful derivative, is a hexamethylene diisocyanate (HDI) trimer, such as those available from Covestro under trade designation "Desmodur N-3800". These derivatives are preferred as they are polymeric, exhibit very low vapor pressures and are substantially free of isocyanate monomer.

In some embodiments, the urethane (meth)acrylate oligomer is the reaction product of a polyisocyanate, such as a hexamethylene diisocyanate (HDI) derivative, having an NCO content of at least 10, 15 or 20 wt.-%. In some cases, the HDI or other polyisocyanate may be reacted with hydroxyl-functional acrylate compounds and polyols. The NCO content is typically no greater than 30 or 25 wt.-%. The polyisocyanate typically has an equivalent weight of at least 150, 160, 170, 180, or 190 grams/per NCO group. The equivalent weight is typically no greater than 500, 450, or 400 and in some embodiments no greater than 350, 300, or 250 grams/per NCO group.

When aliphatic polyisocyanates comprising a cyclic group such as an isophorone diisocyanate (IPDI) derivatives are used, the resulting hardcoat can be less flexible (e.g. have a high mandrel bend) and poor abrasion resistance. Without intending to be bound by theory, it is expected that aromatic isocyanates may also result in the hardcoat being less flexible and exhibiting poor abrasion resistance. However, small concentrations of IPDI derivative and/or aromatic polyisocyanates can be usefully employed in combination with linear aliphatic polyisocyanates, such as the previously described hexamethylene diisocyanate (HDI) derivatives.

The polyisocyanate is reacted with a hydroxyl-functional acrylate compound having the formula HOQ(A)p; wherein Q is a divalent organic linking group, A is a (meth)acryl functional group $-XC(O)C(R_2)=CH_2$ wherein X is O, S, or NR wherein R is H or C1-C4 alkyl, $R_2$ is a lower alkyl of 1 to 4 carbon atoms or H; and p is 1 to 6. The —OH group reacts with the isocyanate group forming a urethane linkage.

In some embodiments, the polyisocyanate can be reacted with a diol acrylate, such as a compound of the formula $HOQ(A)Q_1Q(A)OH$, wherein $Q_1$ is a divalent linking group and A is a (meth)acryl functional group as previously described. Representative compounds include hydantoin hexaacrylate (HHA) (e.g. Example 1 of U.S. Pat. No. 4,262,072 to Wendling et al.), and $CH_2=C(CH_3)C(O)OCH_2CH(OH)CH_2O(CH_2)_4OCH_2CH(OH)CH_2OC(O)C(CH_3)=CH_2$.

Q and $Q_1$ are independently a straight or branched chain or cycle-containing connecting group. Q can include a covalent bond, an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof. In one embodiment, the hydroxyl-functional acrylate compounds used to prepare the urethane (meth)acrylate oligomer are monofunctional, such as in the case of hydroxyl ethyl acrylate, hydroxybutyl acrylate, and caprolactone monoacrylate, available as SR495 from Sartomer. In this embodiment, p=1.

In another embodiment, the hydroxyl-functional acrylate compounds used to prepare the urethane (meth)acrylate oligomer are multifunctional, such as the in the case of glycerol dimethacrylate, 1-(acryloxy)-3-(methacryloxy)-2-propanol (CAS number 1709-71-3), pentaerythritol triacrylate. In this embodiment, p is at least 2, 4, 5, or 6.

In some embodiments, only monofunctional hydroxyl-functional acrylate compounds are utilized in the preparation of the urethane (meth)acrylate oligomer. In other embodiments, a combination of monofunctional and multifunctional hydroxyl-functional acrylate compounds are utilized in the preparation of the urethane (meth)acrylate oligomer. When a multifunctional hydroxyl-functional acrylate compound(s) is utilized, the weight ratio of monofunctional hydroxyl-functional acrylate compound(s) to multifunctional hydroxyl-functional acrylate compound(s) typically ranges from 0.5:1 to 1:0.5. When the urethane (meth)acrylate oligomer is prepared from only multifunctional hydroxyl-functional acrylate compound(s), in some embodiments the resulting hardcoat can be less flexible (i.e. mandrel bend exceeding 5 mm).

In some embodiments, the polyisocyanate can be reacted with a hydroxyl functional compound and a polyol, such as an alkoxylated polyol available from Perstorp Holding AB, Sweden under the trade designation "Polyol 4800". Such polyols can have a hydroxyl number of 500 to 1000 mg KOH/g and a molecular weight ranging from at least 200 or 250 g/mole up to about 500 g/mole. Such polyols are typically described as crosslinkers for polyurethanes.

In other embodiments, the urethane (meth)acrylate oligomer may be obtained commercially; e.g., from Sartomer under the trade "CN 900 Series", such as "CN981" and "CN981B88. Other suitable urethane (meth)acrylate oligomers are available from Sartomer Company under the trade designations "CN9001" and "CN991". The physical properties of these aliphatic urethane (meth)acrylate oligomers, as reported by the supplier, are set forth as follows:

| Trade Designation | Viscosity Cps at 60° C. | Tensile Strength psi | Elongation | Tg (° C.) as determined by DSC |
|---|---|---|---|---|
| CN981 | 6190 | 1113 | 81 | 22 |
| CN981B88 | 1520 | 1520 | 41 | 28 |
| CN9001 | 46,500 | 3295 | 143 | 60 |
| CN991 | 660 | 5,378 | 79 | 27 |

The reported tensile strength, elongation, and glass transition temperature (Tg) properties are based on a homopolymer prepared from such urethane (meth)acrylate oligomer. These embodied urethane (meth)acrylate oligomers can be characterized as having an elongation of at least 20% and typically no greater than 200%; a Tg ranging from about 0 to 70° C.; and a tensile strength of at least 1,000 psi, or at least 5,000 psi.

In some embodiments, the urethane (meth)acrylate oligomer(s) has a weight average molecular weight ranging from 500 to 3,000 g/mole.

The hardcoat composition generally comprises the urethane (meth)acrylate oligomer(s) at a concentration ranging from at least 20 wt.-% to 60 wt.-% solids. In some embodiments, the hardcoat composition comprises the urethane (meth)acrylate oligomer(s) at a concentration of at least 25, 30, or 35 wt.-% solids. The concentration of urethane (meth)acrylate oligomer can be adjusted based on the physical properties of the urethane (meth)acrylate oligomer selected.

In addition to being flexible, the cured hardcoat has high hardness, scratch resistance, and abrasion resistance. For example, a 13 micron thick coating of the cured hardcoat exhibits a pencil hardness of at least 2H. Further, the cured hardcoat exhibits a change in haze of less than 5% after abrasion testing (tested as described in the forthcoming example).

As evidenced by the forthcoming examples the hardness, scratch resistance, and abrasion resistance are improved by the inclusion of an acrylic polymer.

The hardcoat composition comprises an acrylic copolymer. In some embodiments, the acrylic copolymer is derived from a major amount of methyl 2-methylprop-2-enote (also known as methyl methacrylate) and may be characterized as a poly(methyl methacrylate) (PMMA) copolymer. In other embodiments, the acrylic copolymer is derived from a major amount of another alkyl methacrylate, such as n-butyl (meth)acrylate.

In some embodiments, the acrylic copolymer generally comprises polymerized units of at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In some embodiments, the acrylic copolymer comprises at least 50, 60, 70, 80, 90, 91, 92, 93, 94, 95, 96, 97, or 98 wt.-% of polymerized units of (e.g. non-polar) high Tg monomer(s).

Examples of high Tg monofunctional alkyl (meth)acrylate monomers include for example the previously described methyl methacrylate (Tg=105-115° C.) as well as ethyl methacrylate (Tg=65° C.), n-butyl methacrylate (Tg=20° C.), n-propyl methacrylate (Tg=37° C.), isobornyl acrylate (Tg=94° C.), isobornyl methacrylate (Tg=110° C.), and benzyl methacrylate (Tg=54° C.).

In other embodiments, the acrylic copolymer generally comprises polymerized units of at least one (e.g. non-polar) low Tg monomer, i.e. a (meth)acrylate monomer when reacted to form a homopolymer has a Tg of 0° C. or less. The low Tg monomer more typically has a Tg less than −5° C., −10° C., −15° C., −20° C., −25° C., −30° C., −35° C., −40° C., −45° C., −50° C.

Examples of low Tg monofunctional alkyl (meth)acrylate monomers include for example n-butyl acrylate (Tg=−54° C.) and sec-butyl acrylate (Tg=−26° C.).

In some embodiments, the acrylic copolymer comprises at least 50, 60, 70, 80, 90, 91, 92, 93, 94, 95, 96, 97, or 98 wt.-% of polymerized units of (e.g. non-polar) low Tg monomer(s).

The alkyl group of the high Tg monofunctional alkyl (meth)acrylate monomer is typically a straight chain, cyclic, or branched such as in the case of s-butyl methacrylate. When the acrylic copolymer comprises a high concentration of tertiary alkyl(meth)acrylate monomers such as t-butyl methacrylate, the abrasion resistance can be compromised.

In yet other embodiments, the acrylic copolymer comprises at least 50, 60, 70, 80, 90, 91, 92, 93, 94, 95, 96, 97, or 98 wt.-% of polymerized units of a combination of (e.g. non-polar high and low Tg monomer(s). For example, a tertiary alkyl(meth)acrylate monomer can be combined with a greater concentration of non-tertiary alkyl(meth)acrylate monomer.

The acrylic copolymer further comprises polymerized units of a comonomer that provides (e.g. second) functional groups that are capable of forming a hydrogen bond with the urethane (meth)acrylate oligomer. The bond between the first functional group of the urethane (meth)acrylate oligomer(s) and the second functional group of the acrylic polymer is a hydrogen bond. Hence, such functional groups do not form a covalent bond.

A hydrogen bond is an attractive force, or bridge, occurring in polar compounds in which a hydrogen atom of one molecule or functional group is attracted to unshared electrons of another. The hydrogen atom is the positive end of one polar molecule or functional group (otherwise known as a hydrogen bond donor) and forms a linkage with the electronegative end of another molecule or functional group (otherwise known as a hydrogen bond acceptor). Hydrogen bonds generally occur between a donor hydrogen (H) atom covalently bound to a highly electronegative atom such as nitrogen (N), oxygen (O), or fluorine (F) and an acceptor, such as the free electrons on the carbonyl of a urethane group. Such a hydrogen atom is attracted to the electrostatic field of another highly electronegative atom nearby.

By definition, a urethane (meth)acrylate oligomer comprises organic units joined by carbamate (urethane) links, having the formula —NHC(O)O—. The carbonyl of the urethane linkage is capable of being a hydrogen bond acceptor. Thus, in typical embodiments, the acrylic copolymer further comprises polymerized units of a comonomer that provides (e.g. second) functional groups that are capable of donating a hydrogen bond to the (e.g. first) carbonyl acceptor of the carbamate linkages of the urethane (meth) acrylate oligomer. The urethane (meth)acrylate oligomer could comprise other substituents that are capable of forming a hydrogen bond.

The second functional groups of the acrylic polymer are typically hydroxyl groups including hydroxyl groups of acids. It is important to note that poly(meth)methacrylate, depicted as follows, is not callable of being a hydrogen bond donor.

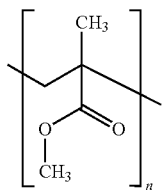

Although the hydroxyl group (—OH) is capable of being a hydrogen bond donor, the pendent methoxy group (—OCH$_3$) of PMMA is not capable of being a hydrogen bond donor.

Various comonomers may be used during the preparation of the acrylic copolymer to provide second functional groups. Such comonomers generally comprise an ethylenically unsaturated group and at least one hydroxyl group including hydroxyl groups of various acids such as sulfonic acids, phosphonic acids, and carbonic acids. The ethylenically unsaturated group of the comonomer copolymerizes with the (meth)acrylate group of the alkyl methacrylate forming the backbone of the acrylic copolymer Representative comonomers are depicted as follows:

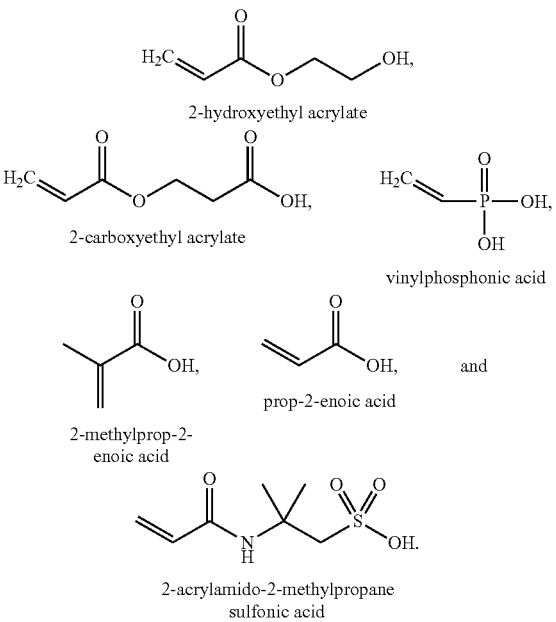

In some embodiments, at least 2, 3, 4, 5, 6, 7, 8, 9, or 10 wt.-% of the polymerized units of the acrylic copolymer comprises a second functional group capable of hydrogen bonding. The acrylic copolymer generally comprises the minimum amount of polymerized units comprising a second functional group capable of hydrogen bonding that provide the desired performance. In typical embodiments, the acrylic copolymer comprises no greater than 25, 20, or 15 wt.-% of polymerized units that comprises a second functional group capable of hydrogen bonding with the urethane (meth) acrylate oligomer.

In some embodiments, the acrylic copolymer further comprises polymerized crosslinker units. In some embodiments, the crosslinker is a multifunctional crosslinker capable of crosslinking polymerized units of the (meth) acrylic polymer such as in the case of crosslinkers comprising functional groups selected from (meth)acrylate, vinyl, and alkenyl (e.g. $C_3$-$C_{20}$ olefin groups); as well as chlorinated triazine crosslinking compounds.

Examples of useful (e.g. aliphatic) multifunctional (meth) acrylate include, but are not limited to, di(meth)acrylates, tri(meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tri(meth)acrylate, and mixtures thereof.

Various combinations of two or more of crosslinkers may be employed.

When present, the crosslinker is typically present in an amount of at least 0.1, 0.2, 0.3, 0.4, 0.5, 1.0, 1.5, or 2 wt.-% ranging up to 5 or 10 wt.-% based on the total weight of the polymerized units of the acrylic copolymer.

The acrylic copolymer typically has a weight average molecular weight of at least 30,000 grams per mole. In some embodiments, the acrylic copolymer has a weight average molecular weight of at least 35,000 grams per mole, or 40,000 grams per mole. The acrylic copolymer may have a weight average molecular weight of up to 100,000; 150,000; 200,000; 250,000; or 300,000 grams per mole or more. Weight average molecular weights of both the urethane oligomer and acrylic polymer can be measured, for example, by gel permeation chromatography (i.e., size exclusion chromatography (SEC)) using the test method described in greater detail in the examples.

The hardcoat composition generally comprises greater than 1 wt.-% and in some embodiments at least 1.5, 2, 2.5, 3, 3.5 or about 4 wt.-% of the acrylic copolymer based on the wt.-% solids of the hardcoat composition. In typical embodiments, the hardcoat composition contains up to about 25 wt.-% of the acrylic copolymer. In some embodiments, the amount of acrylic copolymer is no greater than 20 or 15 wt.-% solids.

The hardcoat composition described herein typically does not contain significant amounts of polymerized units derived from monofunctional (meth)acrylate monomers. A "significant" amount of monofunctional (meth)acrylate monomers may be considered to be more than about 15 wt.-% solids of the hardcoat composition. In some embodiments, the total amount of monofunctional (meth)acrylate monomers(s) in the hardcoat composition is less than 10, 9, 8, 7, 6, 5, 4, 3, 2, or 1 wt.-% solids.

The hardcoat composition described herein also do not contain significant amounts of polymerized units derived from tri-, tetra-, or higher functional acrylates or methacrylates, or in other words multifunctional (meth)acrylate monomers. A "significant" amount of multifunctional (meth)acrylate monomers may be considered to be more than about 15 wt.-% solids of the hardcoat composition. In some embodiments, the total amount of multifunctional (meth)acrylate monomer(s) in the hardcoat composition is less than 10, 9, 8, 7, 6, 5, 4, 3, 2, or 1 wt.-% solids.

The hardcoat composition comprises surface modified inorganic oxide particles that add mechanical strength and durability to the resultant coating. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat.

The size of inorganic oxide particles is chosen to avoid significant visible light scattering. The hard coat composition generally comprises a significant amount of surface modified inorganic oxide nanoparticles having an average (e.g. unassociated) primary particle size or associated particle size of at least 20, 30, 40 or 50 nm and no greater than about 150 nm. When the hardcoat composition lacks a significant amount of inorganic nanoparticles of such size, the cured hardcoat can crack when subjected to the pencil hardness test described herein. The total concentration of inorganic oxide nanoparticles is typically a least 30, 35, or 40, or 45 wt.-% solids and generally no greater than 70 wt.-%, or 65 wt.-%, or 60 wt.-% solids.

The hardcoat composition may comprise up to about 10 wt.-% solids of smaller nanoparticles. Such inorganic oxide nanoparticles typically having an average (e.g. unassociated) primary particle size or associated particle size of at least 1 nm or 5 nm and no greater than 50, 40, or 30 nm.

The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, or a core of an oxide of one type (or a core of a material other than a metal oxide) on which is deposited an oxide of another type. Silica is a common inorganic particle utilized in hardcoat compositions. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid).

Aqueous colloidal silicas dispersions are commercially available from Nalco Chemical Co., Naperville, Ill. under the trade designation "Nalco Collodial Silicas" such as products 1040, 1042, 1050, 1060, 2327, 2329, and 2329K or Nissan Chemical America Corporation, Houston, Tex. under the trade name Snowtex™. Organic dispersions of colloidal silicas are commercially available from Nissan Chemical under the trade name Organosilicasol™. Suitable fumed silicas include for example, products commercially available from Evonik DeGussa Corp., (Parsippany, N.J.) under the trade designation, "Aerosil series OX-50", as well as product numbers-130, -150, and -200. Fumed silicas are also commercially available from Cabot Corp., Tuscola, Ill., under the trade designations CAB-O-SPERSE 2095", "CAB-O-SPERSE A105", and "CAB-O-SIL M5".

It may be desirable to employ a mixture of inorganic oxide particle types to optimize an optical property, material property, or to lower that total composition cost.

As an alternative to or in combination with silica the hardcoat may comprise various high refractive index inorganic nanoparticles. Such nanoparticles have a refractive index of at least 1.60, 1.65, 1.70, 1.75, 1.80, 1.85, 1.90, 1.95, 2.00 or higher. High refractive index inorganic nanoparticles include for example zirconia ("$ZrO_2$"), titania ("$TiO_2$"), antimony oxides, alumina, tin oxides, alone or in combination. Mixed metal oxide may also be employed.

Zirconia for use in the high refractive index layer are available from Nalco Chemical Co. under the trade designation "Nalco OOSSOO8", Buhler AG Uzwil, Switzerland under the trade designation "Buhler zirconia Z-WO sol" and Nissan Chemical America Corporation under the trade name NanoUse ZR™. A nanoparticle dispersion that comprises a mixture of tin oxide and zirconia covered by antimony oxide (RI~1.9) is commercially available from Nissan Chemical America Corporation under the trade designation "HX-05M5". A tin oxide nanoparticle dispersion (RI~2.0) is commercially available from Nissan Chemicals Corp. under the trade designation "CX-S401M". Zirconia nanoparticles can also be prepared such as described in U.S. Pat. Nos. 7,241,437 and 6,376,590.

The inorganic nanoparticles of the hardcoat are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of their surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependent upon several factors such as particle size, particle type, modifier molecular weight, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

In some embodiments, inorganic nanoparticle comprises at least one copolymerizable silane surface treatment. Suitable (meth)acryl organosilanes include for example (meth) acryloy alkoxy silanes such as 3-(methacryloyloxy)propyltrimethoxysilane, 3-acryloylxypropyltrimethoxysilane, 3-(methacryloyloxy)propylmethyldimethoxysilane, 3-(acryloyloxypropyOmethyl dimethoxysilane, 3-(methacryloyloxy)propyldimethylmethoxysilane, and 3-(acryloyloxypropyl) dimethylmethoxysilane. In some embodiments, the (meth)acryl organosilanes can be favored over the acryl silanes. Suitable vinyl silanes include vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, and vinyltris (2-methoxyethoxy)silane.

The inorganic nanoparticle may further comprise various other surface treatments, as known in the art, such as a copolymerizable surface treatment comprising at least one non-volatile monocarboxylic acid having more than six carbon atom or a non-reactive surface treatment comprising a (e.g. polyether) water soluble tail.

To facilitate curing, polymerizable compositions described herein may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Useful free-radical photoinitiators include, for example, those known as useful in the UV cure of acrylate polymers such as described in WO2006/102383.

The hardcoat composition may optionally comprise various additives. For example, silicone or fluorinated additive may be added to lower the surface energy of the hardcoat.

In one embodiment, the hardcoat coating composition further comprises at least 0.005 and preferably at least 0.01 wt-% solids of one or more perfluoropolyether urethane additives, such as described in U.S. Pat. No. 7,178,264. The total amount of perfluoropolyether urethane additives alone or in combination with other fluorinated additives typically ranges up to 0.5 or 1 wt-% solids.

Certain silicone additives have also been found to provide ink repellency in combination with low lint attraction, as described in WO 2009/029438. Such silicone (meth)acrylate additives generally comprise a polydimethylsiloxane (PDMS) backbone and at least one alkoxy side chain terminating with a (meth)acrylate group. The alkoxy side chain may optionally comprise at least one hydroxyl substituent. Such silicone (meth)acrylate additives are commercially available from various suppliers such as Tego Chemie under the trade designations "TEGO Rad 2300", "TEGO Rad 2250", "TEGO Rad 2300", "TEGO Rad 2500", and "TEGO Rad 2700". Of these, "TEGO Rad 2100" provided the lowest lint attraction.

The attraction of the hardcoat surface to lint can be further reduced by including an antistatic agent. For example, an antistatic coating can be applied to the (e.g. optionally primed) substrate prior to coating the hardcoat, such as described in WO2009/005975.

To enhance durability of the hardcoat layer, especially in outdoor environments exposed to sunlight, a variety of commercially available stabilizing chemicals can be added, such as described in previously cited WO2009/005975.

The polymerizable compositions can be formed by dissolving the free-radically polymerizable material(s) in a compatible organic solvent and then combining with the nanoparticle dispersion at a concentration of about 60 to 70 percent solids. A single organic solvent or a blend of solvents can be employed. Depending on the free-radically polymerizable materials employed, suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

The method of forming the hardcoat article or hardcoat protective film includes providing a (e.g. light transmissible) substrate layer and providing the composition on the (optionally primed) substrate layer. The coating composition is dried to remove the solvent and then cured for example by exposure to ultraviolet radiation (e.g. using an H-bulb or other lamp) at a desired wavelength, preferably in an inert atmosphere (less than 50 parts per million oxygen) or an electron beam. Alternatively, a transferable hardcoat film may be formed coating the composition to a release liner, at least partially cured, and subsequently transferring from the release layer to the substrate using a thermal transfer or photoradiation application technique.

The hardcoat composition can be applied as a single or multiple layers to a (e.g. display surface or film) substrate using conventional film application techniques. Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature. Although it is usually convenient for the substrate to be in the form of a roll of continuous web, the coatings may be applied to sheets or individual parts.

The thickness of the hardcoat surface layer is typically at least 0.5 microns, 1 micron, or 2 microns. The thickness of the hardcoat layer is generally no greater than 50 microns or 25 microns. Preferably the thickness ranges from about 5 microns to 15 or 20 microns.

Due to its optical clarity, the hardcoat described herein is particularly useful for application to light-transmissive film substrates or optical displays. The light transmissive substrate may comprise or consist of any of a wide variety of non-polymeric materials, such as glass, or various thermoplastic and crosslinked polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices. Further, the substrate may comprise a hybrid material, having both organic and inorganic components. The substrate and cured hardcoat have a transmission of at least 80%, at least 85%, and preferably at least 90%. The initial haze (i.e. prior to abrasion testing) of the substrate and cured hardcoat can be less than 1 or 0.5, or 0.4, or 0.2%.

Various light transmissive optical films are suitable for use as the film substrate including but not limited to, multilayer optical films, microstructured films such as retroreflective sheeting and brightness enhancing films, (e.g. reflective or absorbing) polarizing films, diffusive films, as well as (e.g. biaxial) retarder films and compensator films.

In some embodiments, the hardcoat also provides antireflective properties. For example, when the hardcoat comprises a sufficient amount of high refractive index nanoparticles, the hardcoat can be suitable as the high refractive index layer of an antireflective film. A low index surface layer is then applied to the high refractive index layer. Alternatively, a high and low index layer may be applied to the hardcoat such as described in U.S. Pat. No. 7,267,850.

For most applications, the substrate thickness is preferably less than about 0.5 mm, and more preferably about 20 microns to about 100, 150, or 200 microns. Self-supporting polymeric films are preferred. The polymeric material can be formed into a film using conventional filmmaking techniques such as by extrusion and optional uniaxial or biaxial orientation of the extruded film. The substrate can be treated to improve adhesion between the substrate and the adjacent layer, e.g., chemical treatment, corona treatment, plasma, flame, or actinic radiation. If desired, an optional tie layer or primer can be applied to the protective film or display substrate to increase the interlayer adhesion with the hardcoat.

In order to reduce or eliminate optical fringing it is preferred that the substrate has a refractive index close to that of the hardcoat layer, i.e. differs from the high refractive index layer by less than 0.05, and more preferably less than 0.02. When the substrate has a high refractive index, a high refractive index primer may be use such as a sulfopolyester antistatic primer, as described in U.S. Patent Application Publication No. 2008/0274352. Alternatively, optical fringing can be eliminated or reduced by providing a primer on the film substrate or illuminated display surface having a refractive index intermediate (i.e. median+/−0.02) between the substrate and the hardcoat layer. Optical fringing can also be eliminated or reduced by roughening the substrate to which the hardcoat is applied. For example the substrate surface may be roughened with a 9 micron to 30 micron microabrasive.

The cured hardcoat layer or film substrate to which the hardcoat is applied may have a gloss or matte surface. Matte films typically have lower transmission and higher haze values than typical gloss films. For examples the haze is generally at least 5%, 6%, 7%, 8%, 9%, or 10% as measured according to ASTM D1003. Whereas gloss surfaces typically have a gloss of at least 130 as measured according to ASTM D 2457-03 at 60°; matte surfaces have a gloss of less than 120.

The hardcoat surface can be roughened or textured to provide a matte surface. This can be accomplished in a variety of ways as known in the art including embossing the hardcoat surface with a suitable tool that has been bead-blasted or otherwise roughened, as well as by curing the composition against a suitable roughened master as described in U.S. Pat. No. 5,175,030 (Lu et al.) and U.S. Pat. No. 5,183,597 (Lu).

Further, various permanent and removable grade adhesive compositions may be provided on the opposite side of the film substrate as the cured hardcoat. For embodiments that employ pressure sensitive adhesive, the protective film article typically includes a removable release liner. During application to a display surface, the release liner is removed so the protective film article can be adhered to the display surface.

Suitable adhesive compositions include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Pat. No. 7,351,470. Several of such adhesives are commercially available from 3M Company, St. Paul, Minn. under the trade designations 8141, 8142, and 8161.

The hardcoat described herein or a protective film can be employed with a variety of portable and non-portable information display articles. The displays include various illuminated and non-illuminated displays articles. Such displays include multi-character and especially multi-line multi-character displays such as liquid crystal displays ("LCDs"), plasma displays, front and rear projection displays, signage, as well as single-character or binary displays such as light emitting tubes ("LEDs"), organic light-emitting diodes ("OLEDs"), signal lamps and switches.

Illuminated display articles include, but are not limited to, PDAs, LCD-TV's (both edge-lit and direct-lit), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, and instrument panel covers. These devices can have planar or curved viewing faces. In one embodiment, the hardcoat or protective film comprising such can be used in place of a cover glass used to protect the touch screen from becoming scratched. In another embodiment, the display article may be characterized as a foldable display.

In one embodiment, the protective film or cured hardcoat (e.g. applied to a glass or other substrate), as described herein, is a surface layer of a touch screen, or a component there such as a touch sensor film substrate or a touch module comprising an assembly of touch sensor substrates.

In some embodiments, the flexible hardcoat described herein is thermoformable after curing.

In some embodiments, the conformable hardcoat is applied to a substrate having at least one metallic or organometallic layer. Such substrate may be employed for the purpose of providing a decorative metallic finish and/or for the purpose of providing an electromagnetic interference (EMI) shield for an electronic device.

The various patents previously cited are incorporated herein by reference.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: phr=parts per hundred rubber; g=grams, min=minutes, h=hour, °C.=degrees Celsius, MPa=megapascals, and N-m=Newton-meter.

Materials

| Material designation | Description |
| --- | --- |
| ESACURE ONE | A photoinitiator, obtained from Lamberti USA, Conshohocken, PA under trade designation "ESACURE ONE" |
| DBTA | Dibutyltin diacetate, obtained from Alfa Aesar, Ward Hill, MA |
| DBTDL | Dibutyltin diacrylate, obtained from Sigma-Aldrich Chemical Company, St. Louis, MO |
| BHT | 2,6-di-t-butyl-4-methylphenol, obtained from Alfa Aesar, Ward Hill, MA |
| 4-hydroxy TEMPO | 4-Hydroxy-2,2,6,6-tetramethylpiperidine 1-oxyl, obtained from Sigma-Aldrich Chemical Company, St. Louis, MO |
| PET3A | Pentaerythritol triacrylate, obtained from Sartomer, Exton, PA, under trade designation "SR444C" |
| AcMac | 1-acryoyloxy-3-methacryoyloxy-2-propanol, CAS number 1709-71-3, TCI America, Portland, OR |
| DESMODUR N3300A | Isocyanurate based hexamethylenediisocyanate oligomer, 100% solids, wt. % NCO of 21.8, equivalent weight of 193, obtained from Covestro LLC, Pittsburgh, PA, under trade designation "DESMODUR N3300A" |
| DESMODUR N100 | Biuret based hexamethylenediisocyanate oligomer, 100% solids, wt. % NCO of 22.0, equivalent weight of 191, obtained from Covestro LLC, Pittsburgh, PA, under trade designation "DESMODUR N100" |
| DESMODUR N3800 | An aliphatic polyisocyanate, wt. % NCO of 11.0, equivalent weight of 382, obtained from Covestro LLC, Pittsburgh, PA under trade designation "DESMODUR N3800" |
| Desmodur H (HDI) | Hexamethylene Diisocyanate, molecular weight 168, from Covestro LLC, Pittsburgh, PA under trade designation "DESMODUR H" |
| MEK | Methyl ethyl ketone, obtained from Avantor Performance Materials, Center Valley, PA |
| Cyclohexanone | Obtained from Alfa Aesar, Ward Hill, MA |
| ELVACITE 2021 | 119,000 MW PMMA resin, obtained from Lucite International, Cordova, TN, under trade designation "ELVACITE 2021" |
| TEGORAD 2250 | A silicone surfactant, obtained from Evonik Industries, Parsippany, NJ, under trade designation "TEGORAD 2250" |
| 2-methylprop-2-enoate (MMA) | Obtained from Alfa Aesar, Ward Hill, MA |
| Vinylphosphonic acid (VPA) | Obtained from Tokyo Chemical Industry Co., Ltd. Tokyo, Japan |
| 2,2'-azobis-(2-methylbutyronitrile) | Obtained from E. I. DuPont de Nemours and Company, Wilmington, DE, under trade designation "VAZO 67" |
| Ethyl acetate | Obtained from VWR International LLC, Radnor, PA |
| Toluene | Obtained from EMD Millipore Corporation, Billerica, MA |
| 2-methylprop-2-enoic acid (MA) | Obtained from Alfa Aesar, Ward Hill, MA |
| n-butyl methacrylate (nBuMA) | Obtained from Alfa Aesar, Ward Hill, MA |
| n-butyl acrylate (nBuA) | Obtained from Alfa Aesar, Ward Hill, MA |
| s-butyl acrylate (sBuA) | Obtained from Polysciences Inc., Warrington, PA |
| n-propyl methacrylate (nPrMA) | Obtained from Alfa Aesar, Ward Hill, MA |
| 2-hydroxyethyl acrylate (HEA) | Obtained from Alfa Aesar, Ward Hill, MA |

-continued

| Material designation | Description |
| --- | --- |
| 2-carboxyethyl acrylate (BCEA) | Obtained from Allnex, Alpharetta, GA |
| 1,6-hexanediol diacrylate (HDDA) | Obtained from Sartomer, King of Prussia, PA |
| Acrylic acid (AA) | Obtained from BASF, Florham Park, NJ |
| 2-acrylamido-2-methylpropane sulfonic acid (AMPS) | Obtained from Lubrizol, Wickliffe, OH, under trade designation "AMPS 2401" |
| THF | Tetrahydrofuran, obtained from Sigma-Aldrich Chemical Company, St. Louis, MO |
| NALCO 2327, colloidal silica dispersion | Nalco Company, Naperville, IL, obtained under trade designation "NALCO 2327" |
| SILQUESTA-174, silane | GE Advanced Materials, Wilton, CT, obtained under trade designation "SILQUEST A-174" |
| PROSTAB 5198 | Obtained from BASF, Florham Park, NJ, under trade designation "PROSTAB 5198" |
| Polyol 4800 | Alkoxylated tetrol, 280 molecular weight, from Perstorp Holding AB, Sweden |

Test Methods

Method for Abrasion Test

Abrasion of the samples was tested cross web to the coating direction using a Taber model 5800 Heavy Duty Linear Abraser (obtained from Taber Industries, North Tonawanda, N.Y.). The stylus oscillated at 60 cycles/min. The stylus was a cylinder with a flat base and a diameter of 5 cm. The abrasive material used for this test was a general purpose scouring pad (obtained from 3M Company, St. Paul, Minn. under trade designation "SCOTCHBRITE #96 GENERAL PURPOSE SCOURING PAD").

3 cm squares were cut from the pads and adhered to the base of the stylus using permanent adhesive tape (obtained from 3M Company, St. Paul, Minn., under trade designation "3M SCOTCH PERMANENT ADHESIVE TRANSFER TAPE"). A single sample was tested for each example with a total weight of 2.0 kg weight and 100 cycles. After abrasion, the optical haze of each sample was measured using a Haze-Gard Plus haze meter (available from BYK Gardner, Columbia Md.) at five different points. The delta haze value for each sample was calculated by subtracting the haze of an untested region of the sample.

Method for Pencil Hardness Test

Pencil hardness of each sample was measured using the JIS K5600-5-4:1999 test procedure and a 1000 g weight. The samples were inspected visually.

Method for Mandrel Bend Test

Mandrel Bend was measured by bending the samples, coating side opposite the mandrel, over a series of mandrels and recording the smallest mandrel diameter that did not show cracking. The bend testing was conducted with the light transmissive film contacting the mandrel.

Molecular Weight Determination

The molecular weight distribution of the compounds was characterized using conventional gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns, available from Varian Inc. (Palo Alto, Calif., USA). Samples of polymeric solutions were prepared by dissolving polymer or dried polymer materials in tetrahydrofuran at a concentration of 0.5 percent (weight/volume) and filtering through a 0.2 micron polytetrafluoroethylene filter that is available from VWR International (West Chester, Pa., USA). The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight ($M_w$) and the polydispersity index (weight average molecular weight divided by number average molecular weight) were calculated for each sample against this standard calibration curve.

Preparative Silica Sol-1

25.25 g of SILQUEST A-174 and 0.5 g of 4-hydroxy-2,2,6,6-tetramethylpiperidine 1-oxyl (5 wt. % PROSTAB) were added to the mixture of 400 g of NALCO 2327 and 450 g of 1-methoxy-2-propanol in a glass jar with stirring at room temperature for 10 minutes. The jar was sealed and placed in an oven at 80° C. for 16 h. Then, the water was removed from the resultant solution with a rotary evaporator at 60° C. until the solid wt. % of the solution was close to 45 wt. %. 200 g of 1-methoxy-2-propanol was charged into the resultant solution and then remaining water was removed by using the rotary evaporator at 60° C. This latter step was repeated for a second time to further remove water from the solution. Finally, the concentration of total $SiO_2$ nanoparticles was adjusted to 45 wt. % by adding 1-methoxy-2-propanol to result in the $SiO_2$ sol containing surface modified $SiO_2$ nanoparticles with an average size of 20 nm.

Preparation of Acrylic Copolymers

Preparative Example 1 (PE1) (89.75:10:0.25 MMA:VPA:HDDA)

A 250 mL, 3-necked, round-bottom flask was equipped with a condenser and a thermometer and charged with methyl 2-methylprop-2-enoate (8.975 g, 9.55 mL, 89.64 mmol), vinylphosphonic acid (1.0 g, 0.72 mL, 9.3 mmol), 1,6-hexanediol diacrylate (0.025 g, 0.025 mL, 0.11 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to room temperature (RT), sparged with air for ~5 min, and the sample was diluted to 20 wt. % by the addition of ethyl acetate (16.7 g, 18.5 mL, 188 mmol). The resulting polymer was analyzed by GPC (conc. in vacuo, dissolved in THF and passed through a 0.2 μm PTFE filter) to give $M_n$=19480; $M_w$=45928; PDI=2.35.

Preparative Example 2 (PE2) (94.75:5:0.25 MMA:MA:HDDA)

A 250 mL, 3-necked, round-bottom flask was equipped with a condenser and a thermometer and charged with methyl 2-methylprop-2-enoate (9.475 g, 10.1 mL, 94.64 mmol), 2-methylprop-2-enoic acid (0.5 g, 0.5 mL, 6 mmol), 1,6-hexanediol diacrylate (0.025 g, 0.025 mL, 0.11 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=33883; Mw=85652; PDI=2.53.

Preparative Example 3 (PE3) (90:10 MMA:MA)

A 250 mL, 3-necked, round-bottom flask was equipped with a condenser and a thermometer and charged with methyl 2-methylprop-2-enoate (9.0 g, 9.6 mL, 90 mmol), 2-methylprop-2-enoic acid (1.0 g, 0.99 mL, 12 mmol), ethyl acetate (11.65 g, 12.9 mL, 130.9 mmol), toluene (11.65 g, 13.4 mL, 126.4 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=44578; Mw=78451; PDI=1.76.

Preparative Example 4 (PE4) (85:15 MMA:MA)

A 250 mL, 3-necked, round-bottom flask was equipped with a condenser and a thermometer and charged with methyl 2-methylprop-2-enoate (8.5 g, 9.0 mL, 85 mmol), 2-methylprop-2-enoic acid (1.5 g, 1.5 mL, 17 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=47304; Mw=82143; PDI=1.74.

Preparative Example 5 (PE5) (95:5 MMA:BCEA)

A 250 mL, 3-necked, round-bottom flask was equipped with a condenser and a thermometer and charged with methyl 2-methylprop-2-enoate (9.5 g, 10 mL, 95 mmol), 2-carboxyethyl acrylate (0.5 g, 0.4 mL, 3 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=24827; Mw=52229; PDI=2.10.

Preparative Example 6 (PE6) (90:10 MMA:BCEA)

A 250 mL, 3-necked, round-bottom flask was equipped with a condenser and a thermometer and charged with methyl 2-methylprop-2-enoate (9.0 g, 9.6 mL, 90 mmol), 2-carboxyethyl acrylate (1.0 g, 0.83 mL, 6.9 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=25548; Mw=57517; PDI=2.25.

Preparative Example 7 (PE7) (89.75:10:0.25 MMA:AA:HDDA)

A 250 mL, 3-necked, round-bottom flask was equipped with a condenser and a thermometer and charged with methyl 2-methylprop-2-enoate (8.975 g, 10.1 mL, 94.64 mmol), acrylic acid (1.0 g, 0.95 mL, 14 mmol), 1,6-hexanediol diacrylate (0.025 g, 0.025 mL, 0.11 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=32041; Mw=81794; PDI=2.55.

Preparative Example 8 (PE8) (90:10 nBuMA:MA)

A 250 mL, 3-necked, round-bottom flask was equipped with a condenser and a thermometer and charged with n-butyl methacrylate (9.0 g, 10 mL, 63 mmol), 2-methylprop-2-enoic acid (1.0 g, 0.99 mL, 12 mmol), ethyl acetate (40.0 g, 44.3 mL, 449 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=17942; Mw=57004; PDI=3.10.

Preparative Example 9 (PE9) (90:10 MMA:AMPS)

A 250 mL, 3-necked, round-bottom flask was equipped with a condenser and a thermometer and charged with methyl 2-methylprop-2-enoate (9.0 g, 9.6 mL, 90 mmol), 2-acrylamido-2-methylpropane sulfonic acid (1.0 g, 4.8 mmol), ethyl acetate (30.0 g, 33.3 mL, 337 mmol), water (10.0 g, 10.0 mL, 555 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=27100; Mw=86700; PDI=3.2.

Preparative Example 10 (PE10) (89.9:10:0.1 MMA:VPA:HDDA)

A 250 mL, 3-necked, round-bottom flask was equipped with a condenser and a thermometer and charged with methyl 2-methylprop-2-enoate (8.99 g, 9.56 mL, 89.8 mmol), vinylphosphonic acid (1.0 g, 0.72 mL, 9.3 mmol), 1,6-hexanediol diacrylate (0.010 g, 0.0099 mL, 0.044 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give $M_n$=14675; $M_w$=37300; PDI=2.54.

Preparative Example 11 (PE11) (89.5:10:0.5 MMA:VPA:HDDA)

A 250 mL, 3-necked, round-bottom flask was equipped with a condenser and a thermometer and charged with methyl 2-methylprop-2-enoate (8.5 g, 9.0 mL, 85 mmol), vinylphosphonic acid (1.0 g, 0.72 mL, 9.3 mmol), 1,6-hexanediol diacrylate (0.050 g, 0.050 mL, 0.22 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give $M_n$=14469; $M_w$=40702; PDI=2.81.

Preparative Example 12 (PE12) (94.75:5:0.25 MMA:VPA:HDDA)

A 250 mL, 3-necked, round-bottom flask was equipped with a condenser and a thermometer and charged with methyl 2-methylprop-2-enoate (9.475 g, 10.10 mL, 94.64 mmol), vinylphosphonic acid (0.50 g, 0.36 mL, 4.6 mmol), 1,6-hexanediol diacrylate (0.025 g, 0.025 mL, 0.11 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give $M_n$=23153; $M_w$=63288; PDI=2.73.

Preparative Example 13 (PE13) (84.75:15:0.25 MMA:VPA:HDDA)

A 250 mL, 3-necked, round-bottom flask was equipped with a condenser and a thermometer and charged with methyl 2-methylprop-2-enoate (8.475 g, 9.02 mL, 84.65 mmol), vinylphosphonic acid (1.5 g, 1.08 mL, 13.9 mmol), 1,6-hexanediol diacrylate (0.025 g, 0.025 mL, 0.11 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=14374; $M_w$=35653; PDI=2.48.

Preparative Example 14 (PE14) (89.75:10:0.25 MMA:BCEA:HDDA)

A 250 mL, 3-necked, round-bottom flask was equipped with a condenser and a thermometer and charged with methyl 2-methylprop-2-enoate (8.975 g, 10.1 mL, 94.64 mmol), 2-carboxyethyl acrylate (1.0 g, 0.83 mL, 6.9 mmol), 1,6-hexanediol diacrylate (0.025 g, 0.025 mL, 0.11 mmol ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give $M_n$=33050; $M_w$=93585; PDI=2.83.

Preparative Example 15 (PE15) (90:10 nBuA:MA)

A 250 mL, 3-necked, round-bottom flask was equipped with a condenser and a thermometer and charged with n-butyl acrylate (9.0 g, 10 mL, 70 mmol), 2-methylprop-2-enoic acid (1.0 g, 0.99 mL, 12 mmol), ethyl acetate (40.0 g, 44.3 mL, 449 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=29744; Mw=85623; PDI=2.88.

Preparative Example 16 (PE16) (90:10 sBuA:MA)

A 250 mL, 3-necked, round-bottom flask was equipped with a condenser and a thermometer and charged with s-butyl acrylate (9.0 g, 70 mmol), 2-methylprop-2-enoic acid (1.0 g, 0.99 mL, 12 mmol), ethyl acetate (40.0 g, 44.3 mL, 449 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=24538; Mw=72621; PDI=2.96.

Preparative Example 17 (PE17) (90:10 nPrMA:MA)

A 250 mL, 3-necked, round-bottom flask was equipped with a condenser and a thermometer and charged with n-propyl methacrylate (9.0 g, 10 mL, 70 mmol), 2-methylprop-2-enoic acid (1.0 g, 0.99 mL, 12 mmol), ethyl acetate (40.0 g, 44.3 mL, 449 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=19846; Mw=49792; PDI=2.51.

Preparative Example 18 (PE18) (90:10 MMA:HEA)

A 250 mL, 3-necked, round-bottom flask was equipped with a condenser and a thermometer and charged with methyl 2-methylprop-2-enoate (9.0 g, 9.6 mL, 90 mmol), 2-hydroxyethyl acetate (1.0 g, 0.99 mL, 8.6 mmol), ethyl acetate (40.0 g, 44.3 mL, 449 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, sparged with air for ~5 min. The resulting polymer was analyzed by GPC (conc. in vacuo, dissolved in THF and passed through a 0.2 μm PTFE filter) to give Mn=14363; Mw=44462; PDI=3.1.

Preparation of Urethane Acrylate Oligomer

Preparative Example 19 (PE19) 1.05 DesN3300 1.0 HEA

A 3 L, 3-necked, round-bottom flask equipped with overhead stirrer and temperature probe was charged with 787.79 g (4.089 eq) DESMODUR N3300A, 310 g of MEK, 452.21 g (3.894 eq) hydroxyethyl acrylate (HEA), and 0.62 g DBTDL, placed in an ice bath, and stirred under dry air for about 45 min. The reaction was then heated to 55° C. for about 2 h. At the end of that time, FTIR analysis showed a small —NCO peak at 2265 $cm^{-1}$.

Preparative Example 20 (PE20) 1.0 DesN3300 0.5 AcMac 0.5 HEA

A 250 mL jar equipped with a stir bar was charged with 53.35 g (0.2769 eq) DESMODUR N3300A, 25 g of MEK, 16.40 g (0.1398 eq) HEA, 30.25 g (0.1398 eq) AcMac, for total of 1.01 eq hydroxyl per equivalent of isocyanate, 0.025 g (250 ppm) BHT, 0.005 g (50 ppm) 4-hydroxy TEMPO, and 0.05 g (500 ppm) DBTDL. The jar was placed in a water bath at room temperature and allowed to stir for 10 min. After 10 min, it was placed into a 55° C. bath for 3 h and allowed to cool over a weekend. At the end of that time the reaction was monitored by FTIR and found to have no —NCO peak at 2265 cm'. The material was 80 wt. % solids.

Preparative Examples 21-24 (PE21-24)

PE21-PE24 were prepared in the same manner as PE20 described above by reacting the preparations summarized in Table 1, below. The reactions were carried out using an appropriately sized jar. The amount of materials used in preparations described in Table 1 were reported in grams (g) and unless noted otherwise, further included 250 ppm BHT, 50 ppm TEMPO, and 500 ppm DBTDL with respect to solids.

The resulting products were at 80 wt. % solids in MEK.

Preparative Example 25 (PE25) PUA Solution 1.0 DesN3300 1.0 HEA

The urethane acrylate of PE38 was prepared by adding 16.7 g of HEA, 29 g of DESMODUR N3300A, 45.5 g of MEK and 0.03 grams of DBTA all at once to a flask. This mixture was then stirred for 3 h at 70° C.

Examples 1-6 (EX1-EX6) and Comparative Examples A-B (CE-A and CE-B)

EX1 coating solution was prepared by mixing the components as summarized in Table 2, below. Desired amount of the PUA solution was added to desired amount of surface modified silica sol (Sol-1) with stirring followed by the addition of desired amount of the PE1 acrylic copolymer solution with stirring. The other components summarized in Table 2, below were added. If required, heat was applied to produce a clear, compatible solution. Note that the amounts of various components added to prepare the coating solutions were in wt. % solids.

Then, to prepare the EX1 sample, the above prepared EX1 coating solution was coated at 41 wt. % solids on 5 mil (0.13 mm) primed PET film (obtained from 3M Company, St. Paul, Minn., under trade designation SCOTCHPAK"). The coating was done using a #28 wire wound rod (available from R.D. Specialties, Webster N.Y.) and dried at 90° C. for 2 minutes. The coating was then cured using a Fusion H bulb (available from Fusion UV Systems, Gaithersburg Md.) at 100% power under nitrogen at 30 feet/minute (12.1 m/min). The cured coating had a thickness of about 13 microns.

EX2-EX6, CE-A and CE-B samples were prepared in the same manner as EX1 except that the compositions of the corresponding coating solutions were varied as described in Table 2, below.

The dried and cured hard coated PET film samples of EX1-EX6, CE-A and CE-B were tested using the test methods described above. The data is summarized in Table 2, below.

TABLE 1

| Sample | Description | Des N100 EW 191 | Des N3800 EW 371.68 | HEA | | MEK |
|---|---|---|---|---|---|---|
| PE21 | 1.0 Des N100 + 1.0 HEA | 61.72 | | 38.28 | | 25 |
| PE22 | 1.0 Des N100 + 0.5 HEA + 0.5 Ac-Mac | 53.13 | | 16.48 | 30.39 AcMac EW 214.22 | 25 |
| PE23 | 1.0 Des N3800 + 1.0 HEA | | 106.73 | 34.01 | | 35.18 |
| PE24 | 1.0 Des N3800 + 0.5 HEA + 0.5 PET3A | | 78.45 | 12.50 | 48.58 PETA3A EW 451.3 | 34.88 |

TABLE 2

| Example | Silica (Sol-1) | Urethane (meth)acrylate PE25 | Acrylic copolymer | Acrylic copolymer Type | Abrasion (delta haze) | Pencil Hardness | Mandrel Bend (mm) |
|---|---|---|---|---|---|---|---|
| EX1 | 59 | 37 | 3.4 | PE1 | 3.6 | 2H | <2 |
| CE-A | 59 | 37 | 3.4 | ELVACITE 2021 | 8 | 2H | 2 |
| CE-B | 59 | 40.4 | none | None | 6.9 | 1H | <2 |
| EX2 | 59 | 37 | 3.4 | PE2 | 2.1 | 2H | <2 |
| EX3 | 59 | 37 | 3.4 | PE3 | 2.9 | 2H | 3 |
| EX4 | 59 | 37 | 3.4 | PE4 | 3.1 | 2H | 4 |
| EX5 | 59 | 37 | 3.4 | PE5 | 4.2 | 2H | 2 |
| EX6 | 59 | 37 | 3.4 | PE6 | 4.6 | 2H | <2 |

Examples of Table 2 included 0.04 TEGORAD 2250 and 0.46 ESACURE ONE.

Examples 7-14 (EX7-EX14)

EX7-EX14 samples were prepared and tested in the same manner as EX1-EX6 described above except that the corresponding composition of the coating solutions were varied as summarized in Table 3, below.

TABLE 3

| Example | Silica (Sol-1) | Urethane (meth)acrylate PE19 | Acrylic copolymer | Acrylic copolymer Type | Abrasion (delta haze) | Pencil Hardness | Mandrel Bend (mm) |
|---|---|---|---|---|---|---|---|
| EX7 | 58.6 | 36.8 | 4.1 | PE7 | 3.2 | 2H | 3 |
| EX8 | 58.6 | 36.8 | 4.1 | PE14 | 2.4 | 2H | 3 |
| EX9 | 58.6 | 36.8 | 4.1 | PE15 | 3.7 | 2H | <2 |
| EX10 | 58.6 | 36.8 | 4.1 | PE16 | 3.8 | 2H | 3 |
| EX11 | 58.6 | 36.8 | 4.1 | PE17 | 2.5 | 2H | <2 |
| EX12 | 58.6 | 36.8 | 4.1 | PE18 | 2.4 | 2H | <2 |
| EX13 | 58.6 | 36.8 | 4.1 | PE8 | 2.8 | 2H | <2 |
| EX14 | 58.6 | 36.8 | 4.1 | PE9 | 3.1 | 2H | <2 |

Examples of Table 3 included 0.04 TEGORAD 2250 and 0.46 ESACURE ONE.

Examples 15-16 (EX15-EX16) and Control Examples C (CE-C)

EX15-EX16 and CE-C samples were prepared and tested in the same manner as EX1-EX6 described above except that the corresponding composition of the coating solutions were varied as summarized in Table 4, below.

TABLE 4

Examples of Table 4 included 0.04 TEGORAD 2250 and 0.46 ESACURE ONE.

| Example | Silica (Sol-1) | Urethane (meth)acrylate | Urethane (meth)acrylate type | Acrylic copolymer PE1 | Abrasion (delta haze) | Pencil Hardness | Mandrel Bend (mm) |
|---|---|---|---|---|---|---|---|
| CE-C | 59 | 37 | PE20 | 3.4 | 2 | 2H | 7 |
| EX15 | 59 | 37 | PE21 | 3.4 | 3.7 | 2H | 3 |
| EX16 | 59 | 37 | PE22 | 3.4 | 2.9 | 2H | 3 |

Examples 17-26 (EX17-EX26) and Control Example D (CE-D)

EX17-EX26 and CE-D samples were prepared and tested in the same manner as EX1-EX6 described above except that the corresponding composition of the coating solutions were varied as summarized in Table 5, below.

TABLE 5

| Example | Silica (Sol-1) | Urethane (meth)acrylate | Urethane (meth)acrylate type | Acrylic copolymer PE1 | Abrasion (delta haze) | Pencil Hardness | Mandrel Bend (mm) |
|---|---|---|---|---|---|---|---|
| EX17 | 59 | 37 | PE23 | 3.4 | 4.9 | 2H | <2 |
| EX18 | 59 | 37 | PE24 | 3.4 | 4.8 | 2H | 5 |
| CE-D | 60.43 | 38 | PE19 | 1.06 | 3.8 | 1H | 4 |
| EX19 | 58.65 | 36.88 | PE19 | 3.97 | 3.1 | 2H | 2 |
| EX20 | 56.97 | 35.82 | PE19 | 6.72 | 2.6 | 2H | 2 |
| EX21 | 55.38 | 34.83 | PE19 | 9.31 | 3.9 | 2H | 3 |
| EX22 | 53.88 | 33.88 | PE19 | 11.77 | 4.4 | 2H | <2 |
| EX23 | 52.68 | 33.13 | PE19 | 14.14 | 4 | 2H | 3 |
| EX24 | 51.26 | 32.23 | PE19 | 16.47 | 4.2 | 2H | <2 |
| EX25 | 49.83 | 31.33 | PE19 | 18.8 | 4.5 | 2H | <2 |
| EX26 | 48.4 | 30.43 | PE19 | 21.13 | 4.3 | 2H | 4 |

Examples of Table 5 included 0.04 TEGORAD 2250 and 0.38-0.47 ESACURE ONE.

Examples 27-33 (EX27-EX33) and Control Examples E (CE-E)

EX27-EX33 and CE-E samples were prepared and tested in the same manner as EX1-EX6 described above except that the corresponding composition of the coating solutions were varied as summarized in Table 6, below.

TABLE 6

| Example | Silica (Sol-1) | Urethane (meth)acrylate | Urethane (meth)acrylate type | Acrylic copolymer | Acrylic copolymer type | Abrasion (delta haze) | Mandrel Bend (mm) |
|---|---|---|---|---|---|---|---|
| CE-E | 31.64 | 62.52 | PE19 | 5.76 | PE1 | 1.7 | 2 |
| EX27 | 42.19 | 52.87 | PE19 | 4.87 | PE1 | 3.6 | <2 |
| EX28 | 48.8 | 46.82 | PE19 | 4.32 | PE1 | 4.1 | <2 |
| EX29 | 55.41 | 40.78 | PE19 | 3.76 | PE1 | 3.7 | 3 |
| EX30 | 62.03 | 34.73 | PE19 | 3.2 | PE1 | 6.6 | 4 |
| EX31 | 68.64 | 28.68 | PE19 | 2.64 | PE1 | 6.7 | 5 |
| EX32 | 58.6 | 36.8 | PE19 | 4.1 | PE10 | 2.7 | <2 |
| EX33 | 58.6 | 36.8 | PE19 | 4.1 | PE11 | 3.8 | <2 |
| EX34 | 58.6 | 36.8 | PE19 | 4.1 | PE12 | 5.4 | <2 |
| EX35 | 58.6 | 36.8 | PE19 | 4.1 | PE13 | 2.6 | <2 |

Examples of Table 5 included 0.04-0.08 TEGORAD 2250 and 0.46-0.78 ESACURE ONE. The pencil hardness for all the Example and comparative Example of Table 6 was 2H except that CE-H had a pencil hardness of 1H.

Preparative Example 36 (PE36) (89.75:10:0.25 MMA:MA:HDDA)

A 250 mL, 3-necked, round-bottom flask was equipped with a condenser and a thermometer and charged with methyl 2-methylprop-2-enoate (8.975 g, 9.55 mL, 89.64 mmol), 2-methylprop-2-enoic acid (1.0 g, 1.0 mL, 12 mmol), 1,6-hexanediol diacrylate (0.025 g, 0.025 mL, 0.11 mmol), ethyl acetate (23.3 g, 25.8 mL, 262 mmol), and 2,2'-azobis-(2-methylbutyronitrile) (0.050 g, 0.25 mmol). The solution was sparged with $N_2$ for ~5 min and then heated to 75° C. overnight (~16 h) under an atmosphere of $N_2$. The solution was then cooled to RT, an additional 16.7 g ethyl acetate was added to dilute the solution to 20 wt % polymer, and the solution was sparged with air for ~5 min. The resulting polymer was analyzed by GPC (conc. in vacuo, dissolved in THF and passed through a 0.2 μm PTFE filter) to give Mn=39166; Mw=117133; PDI=2.99.

Preparative Example 37 (PE37) 1.0 HDI-Polyol 4800-HEA

A 60 mL jar equipped with a stir bar was charged with 10.1 g (0.120 eq) HDI, 22.44 g of MEK, 9.32 g (0.080 eq) HEA and 0.024 g DBTDL. The jar was placed on a hot plate set at 90 C for 60 min. After 60 min, 2.6 grams of Polyol 4800 (0.037 eq) was added and the jar was stirred for another 60 min with the hot plate set at 100° C. The hot plate was then set at 50 C and the reaction was allowed to continue for another 2 hours.

| Example | Silica (Sol-1) | Urethane (meth)acrylate | Urethane (meth)acrylate type | Acrylic copolymer | Acrylic copolymer type | Abrasion (delta haze) | Mandrel Bend (mm) |
|---|---|---|---|---|---|---|---|
| EX 37 | 53.6 | 39.7 | PE37 | 5.2 | PE36 | 4.0 | <2 |

Examples of Table 6 included 0.05 TEGORAD 2250 and 1.4 ESACURE ONE.

Comparative Testing

| Coating | Thickness | Abrasion (delta haze) | Pencil Hardness | Mandrel Bend (mm) |
|---|---|---|---|---|
| Example 10-WO 2009/005975 | 5 microns | 37 | <F | <2 |
| Example 10-WO 2009/005975 | 13 microns | 17 | <F | <2 |

What is claimed is:

1. A hardcoat composition comprising:
urethane (meth)acrylate oligomer having a first functional groups;
an acrylic polymer having second functional groups selected from acid groups, hydroxyl groups, or a combination thereof and the acrylic polymer comprises 2 to 25 wt. % of polymerized units comprising acid groups or 2 to 15 wt. % of polymerized units comprising hydroxyl groups;
wherein the first and second functional groups are capable of forming a hydrogen bond; and
silica nanoparticles.

2. The hardcoat composition of claim 1 wherein the acrylic polymer has a weight average molecular weight ranging from 30,000 to 150,000 g/mole.

3. The hardcoat composition of claim 1 wherein the urethane (meth)acrylate oligomer has a molecular weight ranging from 500 to 3,000 g/mole.

4. The hardcoat composition of claim 1 wherein the acrylic polymer is present in an amount ranging from about 1.5 to 20 wt-% solids.

5. The hardcoat composition of claim 1 wherein the urethane (meth)acrylate oligomer is present in an amount ranging from 20 to 60 wt.-% solids.

6. The hardcoat composition of claim 1 wherein the acrylic polymer does not covalently bond with the urethane (meth)acrylate oligomer during curing such that the acrylic polymer can be solvent extracted from the cured coating composition.

7. The hardcoat composition of claim 1 wherein the silica nanoparticles are present in an amount of at least 35 or 70 wt.-% solids.

8. The hardcoat composition of claim 1 wherein the silica nanoparticles surfaces comprise an organosilane surface treatment compound comprising an ethylenically unsaturated group.

9. The hardcoat composition of claim 1 wherein the urethane (meth)acrylate oligomer is the reaction product of a polyisocyanate, a hydroxyl-functional acrylate compound, and optionally a polyol.

10. The hardcoat composition of claim 9 wherein the hydroxyl-functional acrylate compound comprises a single hydroxyl group and 1 to 3 acrylate groups.

11. The hardcoat composition of claim 1 wherein the hardcoat composition further comprises multi-acrylate crosslinking monomers in an amount no greater than 10 wt. % of the hardcoat composition.

12. The hardcoat composition of claim 1 wherein the hardcoat further comprises an additive selected from a fluorine-containing additive, a silicone-containing additive, or a mixture thereof.

13. The hardcoat composition of claim 1 further comprising organic solvent.

14. The hardcoat composition of claim 1 wherein a 13 micron film of the cured hardcoat has a haze no greater than 5 after abrasion testing.

15. The hardcoat composition of claim 1 wherein a 13 micron film of the cured hardcoat has a pencil hardness of at least to 2H.

16. The hardcoat composition of claim 1 wherein a 13 micron film of the cured hardcoat has a mandrel bend of 5 mm or less.

17. An article comprising the cured hardcoat of claim 1 disposed on a surface of a substrate.

18. The article of claim 17 wherein the substrate is a light transmissive polymeric film.

19. The hardcoat composition of claim 1 wherein the acrylic polymer comprises a least 3, 4, or 5 wt. % of the second functional groups.

20. The hardcoat composition of claim 1 wherein the acrylic polymer comprises 2 to 25 wt. % of polymerized units comprising acid groups.

* * * * *